United States Patent
Masel

(10) Patent No.: US 11,339,483 B1
(45) Date of Patent: May 24, 2022

(54) WATER ELECTROLYZERS EMPLOYING ANION EXCHANGE MEMBRANES

(71) Applicant: Alchemr, Inc., Boca Raton, FL (US)

(72) Inventor: Richard I. Masel, Boca Raton, FL (US)

(73) Assignee: Alchemr, Inc., Boca Raton, FL (US)

( * ) Notice: Subject to any disclaimer, the term of this patent is extended or adjusted under 35 U.S.C. 154(b) by 0 days.

(21) Appl. No.: 17/222,553

(22) Filed: Apr. 5, 2021

(51) Int. Cl.
- *C25B 9/23* (2021.01)
- *C25B 13/00* (2006.01)
- *C25B 11/081* (2021.01)
- *C25B 1/04* (2021.01)

(52) U.S. Cl.
CPC .......... *C25B 9/23* (2021.01); *C25B 1/04* (2013.01); *C25B 11/081* (2021.01); *C25B 13/00* (2013.01)

(58) Field of Classification Search
CPC .... C25B 1/04; C25B 9/23; C25B 9/70; C25B 9/73; C25B 9/75; C25B 9/77
See application file for complete search history.

(56) References Cited

U.S. PATENT DOCUMENTS

| | | |
|---|---|---|
| 3,523,880 A | 8/1970 | Parsi |
| 4,371,433 A | 2/1983 | Balko et al. |
| 4,445,994 A | 5/1984 | Divisek et al. |
| 4,615,780 A | 10/1986 | Walker |
| 5,573,646 A | 11/1996 | Saito et al. |
| 5,904,829 A | 5/1999 | Foller et al. |
| 5,980,724 A | 11/1999 | Roberts et al. |
| 5,997,716 A | 12/1999 | Roberts et al. |
| 6,280,594 B1 | 8/2001 | Yamaoka |
| 9,340,882 B2 | 5/2016 | Tampucci et al. |
| 9,370,773 B2 | 6/2016 | Masel et al. |
| 9,580,824 B2 | 2/2017 | Masel et al. |
| 9,828,313 B2 | 11/2017 | Weiss et al. |
| 10,647,652 B2 | 5/2020 | Masel et al. |
| 2002/0160053 A1 | 10/2002 | Yahagi et al. |
| 2008/0277287 A1* | 11/2008 | Dopp .................. C25B 9/40  205/348 |
| 2013/0140171 A1* | 6/2013 | Hinatsu ................ C25B 1/04  204/256 |
| 2014/0202875 A1 | 7/2014 | Mofakhami |

(Continued)

FOREIGN PATENT DOCUMENTS

| | | |
|---|---|---|
| AU | 2009290161 B2 | 2/2011 |
| CA | 2989151 A1 | 12/2016 |

(Continued)

OTHER PUBLICATIONS

Gilliam et al. A review of specific conductivities of potassium hydroxide solutions for various concentrations and temperatures. International Journal of Hydrogen Energy. vol. 32, pp. 359-364. 2007. (Year: 2007).*

(Continued)

*Primary Examiner* — Ciel P Contreras
(74) *Attorney, Agent, or Firm* — Cook Alex Ltd.

(57) ABSTRACT

A water electrolyzer comprises an electrolyzer stack comprising at least two electrochemical cells. Each cell comprises an anion exchange membrane, a base metal anode electrocatalyst, a base metal cathode electrocatalyst, and a sufficiently long ion conduction path between adjacent cells such that shunt currents are less than 1% of the total current supplied to the stack.

15 Claims, 5 Drawing Sheets

(56) References Cited

U.S. PATENT DOCUMENTS

| | | | |
|---|---|---|---|
| 2015/0176142 A1 | 6/2015 | Lambert et al. | |
| 2015/0349368 A1 | 12/2015 | Arges et al. | |
| 2016/0237578 A1 | 8/2016 | Ichikawa et al. | |
| 2016/0312371 A1 | 10/2016 | Kamei et al. | |
| 2017/0189898 A1* | 7/2017 | Masel | C02F 1/461 |
| 2017/0218525 A1 | 8/2017 | Swaminathan et al. | |
| 2019/0127863 A1* | 5/2019 | Masel | C25B 13/08 |
| 2019/0211463 A1* | 7/2019 | Masel | C25B 13/08 |
| 2019/0264338 A1* | 8/2019 | Karp | C25B 1/55 |
| 2020/0102659 A1 | 4/2020 | Park et al. | |
| 2020/0358074 A1 | 11/2020 | Mitra et al. | |

FOREIGN PATENT DOCUMENTS

| | | | |
|---|---|---|---|
| CN | 1364098 A | 8/2002 | |
| CN | 1930709 A | 3/2007 | |
| CN | 102021604 B | 4/2011 | |
| CN | 102034989 A | 4/2011 | |
| CN | 102688664 A | 9/2012 | |
| CN | 102874905 A | 1/2013 | |
| CN | 103109336 B | 5/2013 | |
| CN | 104192957 A | 12/2014 | |
| CN | 204111387 U | 1/2015 | |
| CN | 104716304 A | 6/2015 | |
| CN | 104846393 A | 8/2015 | |
| CN | 102906924 A | 1/2016 | |
| CN | 105502761 A | 4/2016 | |
| CN | 205275379 U | 6/2016 | |
| CN | 106660785 A | 5/2017 | |
| CN | 106981674 A | 7/2017 | |
| CN | 107298450 B | 10/2017 | |
| CN | 107299361 A | 10/2017 | |
| CN | 107721038 A | 2/2018 | |
| CN | 105369288 A | 3/2018 | |
| CN | 107746098 A | 3/2018 | |
| CN | 107919484 A | 4/2018 | |
| CN | 108075139 A | 5/2018 | |
| CN | 108083366 A | 5/2018 | |
| CN | 108226781 A | 6/2018 | |
| CN | 108341420 A | 7/2018 | |
| CN | 108341421 A | 7/2018 | |
| CN | 109378512 A | 2/2019 | |
| CN | 109390614 A | 2/2019 | |
| CN | 110492145 B | 2/2019 | |
| CN | 109758918 A | 5/2019 | |
| CN | 109811358 B | 5/2019 | |
| CN | 109863227 A | 6/2019 | |
| CN | 109913886 A | 6/2019 | |
| CN | 209249590 U | 8/2019 | |
| CN | 209418662 U | 9/2019 | |
| CN | 209418663 U | 9/2019 | |
| CN | 110492145 A | 11/2019 | |
| CN | 110550743 A | 12/2019 | |
| CN | 111850592 A | 10/2020 | |
| CN | 112290126 A | 1/2021 | |
| DE | 19752111 C1 | 2/1999 | |
| EP | 2463407 A1 | 6/2012 | |
| EP | 2434033 B1 | 1/2013 | |
| GB | 812377 A | 4/1959 | |
| JP | H11128940 A | 5/1999 | |
| JP | 2006322053 A | 11/2006 | |
| JP | 2007284705 A | 11/2007 | |
| JP | 2009117282 A | 5/2009 | |
| JP | 2011016065 A | 1/2011 | |
| JP | 5761874 B2 | 8/2015 | |
| JP | 6526631 B2 | 6/2019 | |
| JP | 6625756 B2 | 12/2019 | |
| KR | 20130099684 A | 9/2013 | |
| KR | 101724060 B1 | 4/2017 | |
| KR | 20180033798 A | 4/2018 | |
| KR | 20180046192 A | 5/2018 | |
| KR | 101911873 B1 | 10/2018 | |
| KR | 20180128562 A | 12/2018 | |
| KR | 102024747 B1 | 11/2019 | |
| KR | 20200001646 A | 1/2020 | |
| NL | 1013630 C2 | 5/2001 | |
| RU | 2107752 C1 | 3/1998 | |
| WO | 1999008778 A1 | 2/1999 | |
| WO | 1999026716 A1 | 6/1999 | |
| WO | 2001092604 A2 | 12/2001 | |
| WO | 2003002784 A2 | 1/2003 | |
| WO | 2008044499 A1 | 4/2008 | |
| WO | 2009104570 A1 | 8/2009 | |
| WO | 2016135215 A1 | 9/2016 | |
| WO | 2017022775 A1 | 2/2017 | |
| WO | 2018005825 A1 | 1/2018 | |
| WO | 2018058094 A1 | 3/2018 | |
| WO | 2020044348 A1 | 3/2020 | |
| WO | 2020160424 A1 | 8/2020 | |
| WO | 2020163910 A1 | 8/2020 | |
| WO | 2020198627 A1 | 10/2020 | |
| WO | 2020238731 A1 | 12/2020 | |
| WO | 2020238732 A1 | 12/2020 | |
| WO | 2020261295 A1 | 12/2020 | |

OTHER PUBLICATIONS

Electrical Conductivity of Aqueous Solutions. Haynes. CRC Handbook of Chemistry and Physics, 91st Edition. p. 5-71. 2010-2011. (Year: 2011).*

Abbasi et al., A Roadmap to Low-Cost Hydrogen with Hydroxide Exchange Membrane Electrolyzers, Advanced Materials, 31, 1805876 (2019), pp. 1-14.

Aili et al., Porous poly(perfluorosulfonic acid) membranes for alkaline water electrolysis, Journal of Membrane Science 493 (2015), pp. 589-598.

Bodner et al., H2 generation from alkaline electrolyzer, WIREs Energy Environ. 4 (2015), pp. 365-381.

Cho et al., Factors in electrode fabrication for performance enhancement of anion exchange membrane water electrolysis, Journal of Power Sources 347 (2017), pp. 283-290.

Diaz et al., Alkali doped poly (2,5-benzimidazole) membrane for alkaline water electrolysis: Characterization and performance, Journal of Power Sources 312 (2016), pp. 128-136.

Forgie et al., Bimetallic Ru Electrocatalysts for the OER and Electrolytic Water Splitting in Acidic Media, Electrochemical and Solid-State Letters 13 (4) (2010), pp. B36-B39.

Fortin et al., High-performance alkaline water electrolysis using Aemion™ anion exchange membranes, Journal of Power Sources 451 (2020), pp. 1-11.

Ito et al., Experimental investigation of electrolytic solution for anion exchange membrane water electrolysis, International Hournal of Hydrogen Energy 43 (2018), pp. 17030-17039.

Ju et al., Lab-Scale Alkaline Water Electrolyzer for Bridging Material Fundamentals with Realistic Operation, ACS Sustainable Chemistry & Engineering, 6 (2018), pp. 4829-4837.

Jupudi et al., Prediction of shunt currents in a bipolar electrolyzer stack by difference calculus, Journal of Applied Electrochemistry, 37 (2007) pp. 921-931.

Kaczur et al., Carbon Dioxide and Water Electrolysis Using New Alkaline Stable Anion Membranes, Frontiers in Chemistry 6 (2018), pp. 1-16.

Kraglund et al., Zero-Gap AlkalineWater Electrolysis Using Ion-Solvating Polymer Electrolyte Membranes at Reduced KOH Concentralions, Journal of The Electrochemical Society, 163 (11) (2016), pp. F3125-F3131.

Lagadec et al., Water electrolysers with closed and open electrochemical systems, Nature Materials 19 (2020), pp. 1140-1150.

Leng et al., Solid-State Water Electrolysis with an Alkaline Membrane, Journal of the American Chemical Society, 134 (2012), pp. 9054-9057.

Li et al., Phenyl Oxidation Impacts the Durability of Alkaline Membrane Water Electrolyzer, ACS Applied Materials & Interfaces, 11 (2019), pp. 9696-9701.

Liu et al., An Alkaline Water Electrolyzer with Sustainion™ Membranes: 1 A/cm² at 1.9 V with Base Metal Catalysts, ECS Transactions, 77 (9) (2017), pp. 71-73.

Liu et al., The effect of membrane on an alkaline water electrolyzer, International Journal of Henergy 42 (2017), pp. 29661-29665.

(56) References Cited

OTHER PUBLICATIONS

Lu et al., Piperidinium-Functionalized Poly(Vinylbenzyl Chloride) Cross-linked by Polybenzimidazole as an Anion Exchange Membrane with a Continuous Ionic Transport Pathway, Industrial & Engineering Chemistry Research 59 (2020), pp. 21077-21087.

Masel et al., Anion Exchange Membrane Electrolyzers Showing 1 A/cm2 at Less Than 2 V, ECS Transactions 75 (14) (2016), pp. 1143-1146.

Mayerhofer et al., Bipolar Membrane Electrode Assemblies for Water Electrolysis, ACS Applied Energy Materials 3 (2020), pp. 9635-9644.

Miller et al., Green hydrogen from anion exchange membrane water electrolysis: a review of recent developments in critical materials and operating conditions, Sustainable Energy & Fuels 4 (2020), pp. 2114-2133.

Mustain et al., Durability challenges of anion exchange membrane fuel cells, Energy & Environmental Science 13 (2020), pp. 2805-2838.

Parrondo et al., Degradation of anion exchange membranes used for hydrogen production by ultrapure water electrolysis, RSC Advances 4 (2014), pp. 9875-9879.

Pavel et al., Highly Efficient Platinum Group Metal Free Based Membrane-Electrode Assembly for Anion Exchange Membrane Water Electrolysis, Angewandte Chemie International Edition 53 (2014), pp. 1378-1381.

Pletcher et al., Prospects for alkaline zero gap water electrolysers for hydrogen production, International Journal of Hydrogen Energy 36 (2011), pp. 15089-15104.

Samsudin et al., Preparation and Characterization of PVA/PDDA/Nano-Zirconia Composite Anion Exchange Membranes for Fuel Cells, Polymers 11 (2019), pp. 1399-1411.

Seetharaman et al., Graphene oxide modified non-noble metal electrode for alkaline anion exchange membrane water electrolyzers, International Journal of Hydrogen Energy 38 (2013), pp. 14934-14942.

Ursua, Hydrogen Production From Water Electrolysis: Current Status and Future Trends, Proceedings of the IEEE, 100 (2) (2012), pp. 410-426.

Vengatesan et al., Quaternized poly (styrene-co-vinylbenzyl chloride) anion exchange membranes for alkaline water electrolysers, Journal of Power Sources 284 (2015), pp. 361-368.

Vincent et al., Low cost hydrogen production by anion exchange membrane electrolysis: A review (Renewable and Sustainable Energy Reviews, 81 (2017), pp. 1690-1704.

Xiao et al., First implementation of alkaline polymer electrolyte water electrolysis working only with pure water, Energy & Environmental Science, 5 (2012), pp. 7869-7871.

Xu et al., Integrated Reference Electrodes in Anion-Exchange-Membrane Electrolyzers: Impact of Stainless-Steel Gas-Diffusion Layers and Internal Mechanical Pressure, ACS Energy Letters, 6 (2021), pp. 305-312.

Zeng et al., Recent progress in alkaline water electrolysis for hydrogen production and applications, Progress in Energy and Combustion Science 36 (2010), pp. 307-326.

\* cited by examiner

WATER ELECTROLYZERS EMPLOYING ANION EXCHANGE MEMBRANES

FIELD OF THE INVENTION

The field of the invention is electrochemistry. The devices, systems and compositions described herein involve the electrolysis of water.

BACKGROUND OF THE INVENTION

The electrolysis of water is presently used as a source of hydrogen in, for example, hydrogen filling stations and chemical plants, and as a way of storing excess renewable energy using a technology called "power-to-gas".

There are two main types of low temperature electrolyzers: proton exchange membrane (PEM) electrolyzers and alkaline water electrolyzers. PEM electrolyzers are able to operate at current densities around 1 A/cm$^2$ at cell voltages less than 2 V, and can be turned on and off quickly. Unfortunately, PEM electrolyzers typically require the use of precious metal catalysts, such as platinum or iridium. This is a significant economic limitation.

In contrast, the present generation of alkaline water electrolyzers do not require the use of precious metals; instead, base metal catalysts can be used. Unfortunately, the present generation of alkaline water electrolyzers typically operate at lower current densities than PEM electrolyzers. This raises the capital equipment cost.

For example, U.S. Pat. No. 4,445,994 notes that alkaline water electrolyzers operate at 200-300 mA/cm$^2$ (0.2-0.3 A/cm$^2$) at cell potentials of 1.8-2 V. The '994 patent also indicates that currents of 1 A/cm$^2$ can be obtained by increasing the cell temperature to 110° C., but as pointed out in U.S. patent application Ser. No. 15/029,952 (published as US2016/0237578), the upper temperature limit of a practical alkaline water electrolyzer is 80-90° C., since excessive corrosion above 80-90° C. is observed in these high pH systems (typically greater than 1 M KOH electrolyte). Recently, U.S. patent application Ser. No. 15/103,924 (published as US2016/0312371) disclosed an improved electrolyzer design that can obtain 40 A/dm$^2$ (0.4 A/cm$^2$) at 80° C. and 1.9V. This is a significant improvement, but still below the performance of a PEM electrolyzer.

Discussions in the literature around anion exchange membrane (AEM) water electrolyzers as replacements for conventional alkaline water electrolyzers have also begun. A recent review by Vincent and Bessarabov (Renewable and Sustainable Energy Reviews, volume 81, pages 1690-1704 (2018)) states that "few research articles (less than 20) have been published on AEM water electrolysis."

Many additional papers have been published since 2018, but most only examine single cell performance. Electrolyzer stacks, combining multiple cells are needed, and stack design has not been extensively explored.

There is, however, a small commercial AEM electrolyzer available from Enapter that contains a miniature electrolyzer stack. Enapter's cell design is described in U.S. Pat. No. 9,340,882. At the time Enapter's AEM electrolyzer was designed, the available AEM's were not stable in KOH concentrations above 1%. As a result, Enapter designed their electrolyzer to operate by feeding a 1% by weight KOH (0.17 M) solution into the cell.

More recently, though, Masel U.S. Pat. Nos. 9,370,773, and 9,580,824 demonstrated AEM's that are stable in 9 M KOH at room temperature. That allowed Masel and coworkers to develop AEM electrolyzers that operate at higher KOH concentrations as described in U.S. Pat. No. 10,647,652. The advantages of these AEM electrolyzers are:

(a) the cell currents are much higher so the cells can produce much more hydrogen,
(b) base metals are stable at the higher pH's so the use of precious metal catalysts can be avoided.

The use of higher KOH concentrations presents a key challenge: as the KOH concentration increases, shunt currents increase, as described in U.S. Pat. No. 4,371,433 and Netherlands Patent No. 1013630.

The present AEM electrolyzer design minimizes, or at least mitigates, the shunt currents and operates at currents of 1 A/cm$^2$ or more.

SUMMARY OF THE INVENTION

A water electrolyzer comprises an electrolyzer stack comprising at least two electrochemical cells. Each cell comprises:
(a) an anode comprising a quantity of anode electrocatalyst;
(b) a cathode comprising a quantity of cathode electrocatalyst;
(c) a source of a solution comprising water directed to at least one of said anode and said cathode,
(d) an anion exchange membrane interposed between said anode and said cathode,
wherein:
(i) said solution has a conductivity ($\sigma_{sol}$) of at least 0.05 S/cm at 60° C.,
(ii) said membrane has an average thickness (t) and a conductivity ($\alpha_{mem}$) at 60° C. in 1 M KOH, and
(iii) the shortest ion conduction path ($L_{GDLA}$) between the anode gas diffusion layer (GDL) of any given cell and the anode GDL of any different cell in the stack is:

$$L_{GDLA} > 10 * t * \sigma_{sol}/\sigma_{mem}$$

Preferably, $L_{GDLA}$ is:

$$L_{GDLA} > 50 * t * \sigma_{sol}/\sigma_{mem}$$

More preferably, $L_{GDLA}$ is at least 2 cm, preferably at least 3 cm, 4 cm, 5 cm, 6 cm, 7 cm, 8 cm, 9 cm, or 10 cm.

Preferably, the solution has a pH greater than 8 at 25° C. More preferably, the solution has a pH greater than 10 at 25° C. Most preferably, the solution has a pH greater than or equal to 12 at 25° C.

Preferably, $\sigma_{sol} > 0.05$ S/cm, more preferably $\sigma_{sol} > 0.1$ S/cm.

Preferably, the electrolyzer comprises a conduit fluidly connecting the anode of one cell in the stack to the anode of a different cell in the stack, and the source of a solution comprising water is directed to the conduit.

Preferably, the electrolyzer comprises an electrical connection between the anode of one cell in the stack and the cathode of a different cell in the stack.

Preferably, the electrolyzer comprises a source of potential between the cathode of the one cell in the stack and the anode of a different cell in the stack.

Preferably, the electrolyzer comprises a conduit fluidly connecting the cathode of one cell in the stack to the cathode of a different cell in the stack.

Preferably, the cathode electrocatalyst is in the form of unsupported particles or particles supported on an electrically conductive support and the particles have an average size between 0.6 nm and 100 nm.

Preferably, the anode catalyst comprises a base metal catalyst. More preferably, the anode catalyst consists essentially of one or more base metal catalysts.

Preferably, the cathode catalyst comprises a base metal catalyst. More preferably, the cathode catalyst consists essentially of one or more base metal catalysts.

Preferably, the membrane comprises positively charged cyclic amines. More preferably, the positively charged cyclic amines are imidazoliums, pyridiniums or piperidiniums.

DETAILED DESCRIPTION OF ILLUSTRATIVE EMBODIMENT(S)

Figure 1:
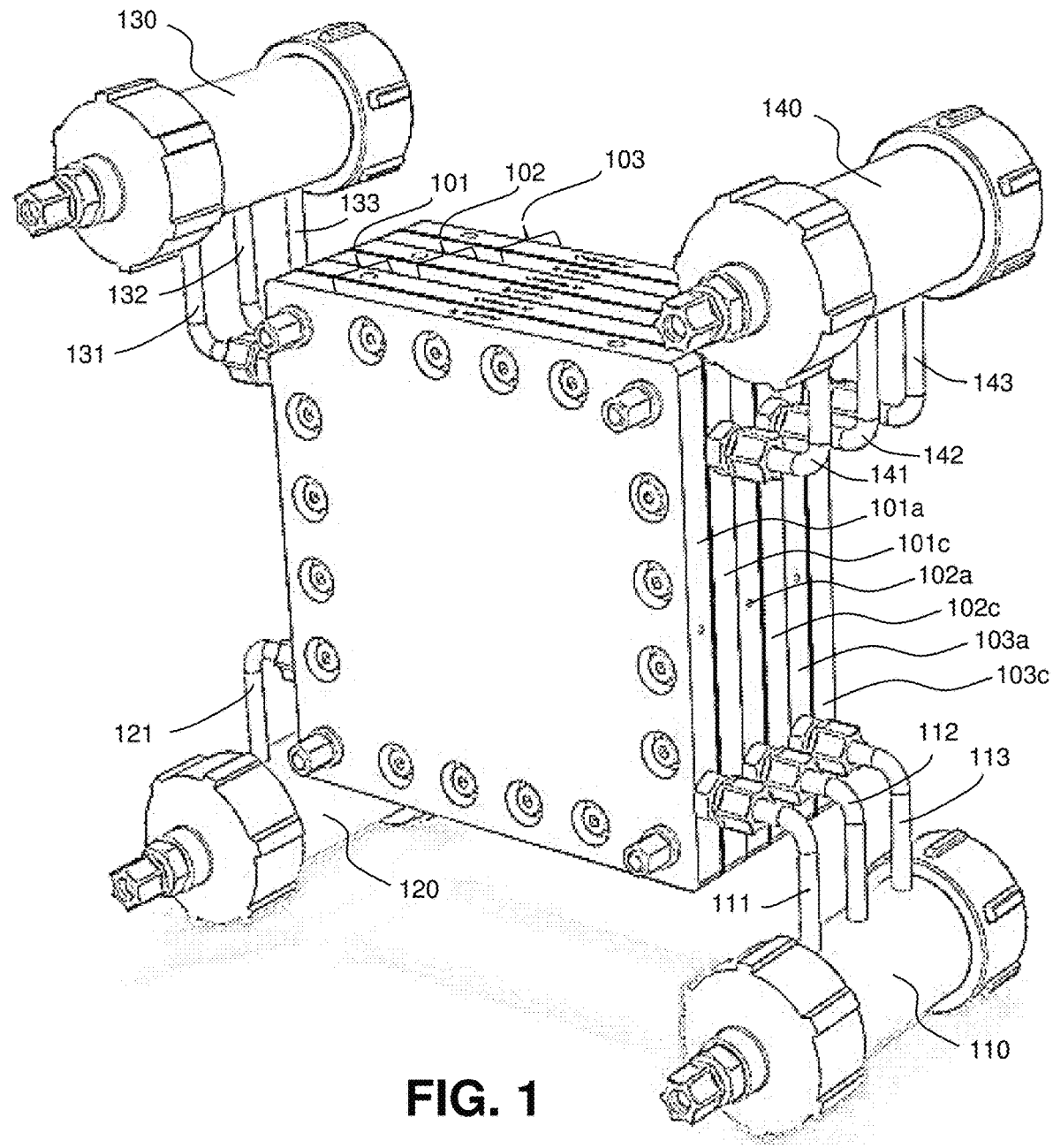
FIG. 1 is a perspective view of an electrolyzer stack comprising three electrolyzer cells 101, 102 and 103.

It is understood that the process is not limited to the particular methodology, protocols and reagents described herein, as these can vary as persons familiar with the technology involved here will recognize. It is also to be understood that the terminology used herein is used for the purpose of describing particular embodiments only, and is not intended to limit the scope of the process. It also is to be noted that as used herein and in the appended claims, the singular forms "a," "an," and "the" include the plural reference unless the context clearly dictates otherwise. Thus, for example, a reference to "a linker" is a reference to one or more linkers and equivalents thereof known to those familiar with the technology involved here. Similarly, the phrase "and/or" is used to indicate one or both stated cases can occur, for example, A and/or B includes (A and B) and (A or B).

Unless defined otherwise, technical and scientific terms used herein have the same meanings as commonly understood by one of ordinary skill in the art to which the process pertains. The embodiments of the process and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment can be employed with other embodiments as a person familiar with the technology here would recognize, even if not explicitly stated herein.

Any numerical value ranges recited herein include all values from the lower value to the upper value in increments of one unit, provided that there is a separation of at least two units between any lower value and any higher value. As an example, if it is stated that the concentration of a component or value of a process variable such as, for example, size, angle size, pressure, time and the like, is, for example, from 1 to 98, specifically from 20 to 80, more specifically from 30 to 70, it is intended that values such as 15 to 85, 22 to 68, 43 to 51, 30 to 32, and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the process are defined specifically. Particular methods, devices, and materials are described, although any methods and materials similar or equivalent to those described herein can be used in the practice or testing of the process.

Definitions

The term "polymer electrolyte membrane" as used herein refers to both cation exchange membranes, which generally comprise polymers having multiple covalently attached negatively charged groups, and anion exchange membranes, which generally comprise polymers having multiple covalently attached positively charged groups. Typical cation exchange membranes include proton conducting membranes, such as the perfluorosulfonic acid polymer available under the trade designation NAFION from E. I. du Pont de Nemours and Company (DuPont) of Wilmington, Del.

The term "anion exchange membrane electrolyzer" as used herein refers to an electrolyzer with an anion-conducting polymer electrolyte membrane separating the anode from the cathode.

The term "Hydrogen Evolution Reaction," abbreviated "HER," as used herein refers to the electrochemical reaction $2H^+ + 2e^- \rightarrow H_2$.

The term "MEA" as used herein refers to a membrane electrode assembly.

The term "UEA" as used herein refers to a unitized electrode assembly.

The term "Millipore water" as used herein refers to water that is produced by a Millipore filtration system with a resistivity of at least 18.2 megaohm-cm.

The term "imidazolium" as used herein refers to a positively charged ligand containing an imidazole group. This includes a bare imidazole or a substituted imidazole. Ligands of the form:

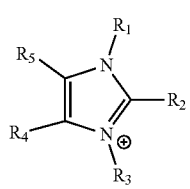

where $R_1$-$R_5$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "pyridinium" as used herein refers to a positively charged ligand containing a pyridine group. This includes a bare pyridine or a substituted pyridine. Ligands of the form:

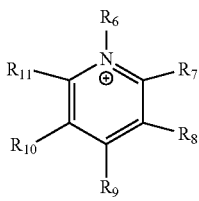

where $R_6$-$R_{11}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "phosphonium" as used herein refers to a positively charged ligand containing phosphorous. This includes substituted phosphorous. Ligands of the form:

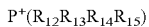

$$P^+(R_{12}R_{13}R_{14}R_{15})$$

where $R_{12}$-$R_{15}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "piperidinium" as used herein refers to a positively charged ligand of the form:

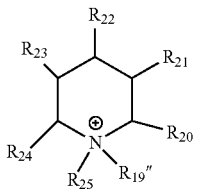

where $R_{19}$-$R_{25}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "positively charged cyclic amine" as used herein refers to a positively charged ligand containing a cyclic amine. This specifically includes imidazoliums, pyridiniums, pyrazoliums, pyrrolidiniums, pyrroliums, pyrimidiums, piperidiniums, indoliums, triaziniums, and polymers thereof, such as the vinyl benzyl copolymers described herein.

The term "simple amine" as used herein refers to a species of the form:

$$N(R_{16}R_{17}R_{18})$$

where $R_{16}$-$R_{18}$ are each independently selected from hydrogen, linear alkyls, branched alkyls, cyclic alkyls, heteroalkyls, aryls, heteroaryls, alkylaryls, and heteroalkylaryls, but not polymers.

The term "precious metal" as used herein refers to one or more of Ru, Rh, Pd, Ag, Re, Os, Ir, Pt, and Au.

The term "base metal catalyst" as used herein refers to a catalyst that is substantially free of precious metals.

The term "shunt current" as used herein refers to a portion of the electrical current applied to the stack that follow a path through the fluid connections between adjacent cells rather than through the membrane. The current can be transferred through the fluid in the connections or through the conduits and fittings.

The term "bipolar plate" as used herein is a single electrically conductive plate that serves as the cathode or cathode flow field for one cell, and an anode or anode flow field for an adjacent cell in a stack.

The term "shortest ion conduction path between anodes of adjacent cells" as used herein refers to the shortest ion conduction path from the anode of a given cell and to the anode of an adjacent cell.

Specific Example 1

The objective of this example is to provide an electrolyzer design that has low shunt current when fed solutions with a conductivity above 0.1 S/cm.

FIG. 1 shows a diagram of a three cell electrolyzer stack. The stack consists of:
(a) electrochemical cell 101 comprising anode 101a and cathode 101c,
(b) electrochemical cell 102 comprising anode 102a and cathode 102c,
(c) electrochemical cell 103 comprising anode 103a and cathode 103c,
(d) anode inlet manifold 110,
(e) pipes 111, 112 and 113 connecting the anode inlet manifold 110 to respective anodes 101a, 102a and 103a,
(f) cathode inlet manifold 120,
(g) pipe 121 connecting cathode inlet manifold 120 to cathode 101c. There are also pipes (hidden in FIG. 1), numbered 122 and 123, that connect cathode inlet manifold 120 to respective cathodes 102c and 103c,
(h) anode outlet manifold 130,
(i) pipes 131, 132 and 133 connecting anode outlet manifold 130 to respective anodes 101a, 102a and 103a,
(j) cathode outlet manifold 140, and
(k) pipes 141, 142 and 143 connecting cathode outlet manifold 140 to respective cathodes 101c, 102c and 103c.

Cathode 101c is in electrical contact with anode 102a. Cathode 102c is in electrical contact with anode 103a. FIG. 1 shows adjacent anodes and cathodes (for example, cathode 101c and anode 102a), as separate components, but the adjacent components could be combined into a single bipolar plate.

Figure 2:
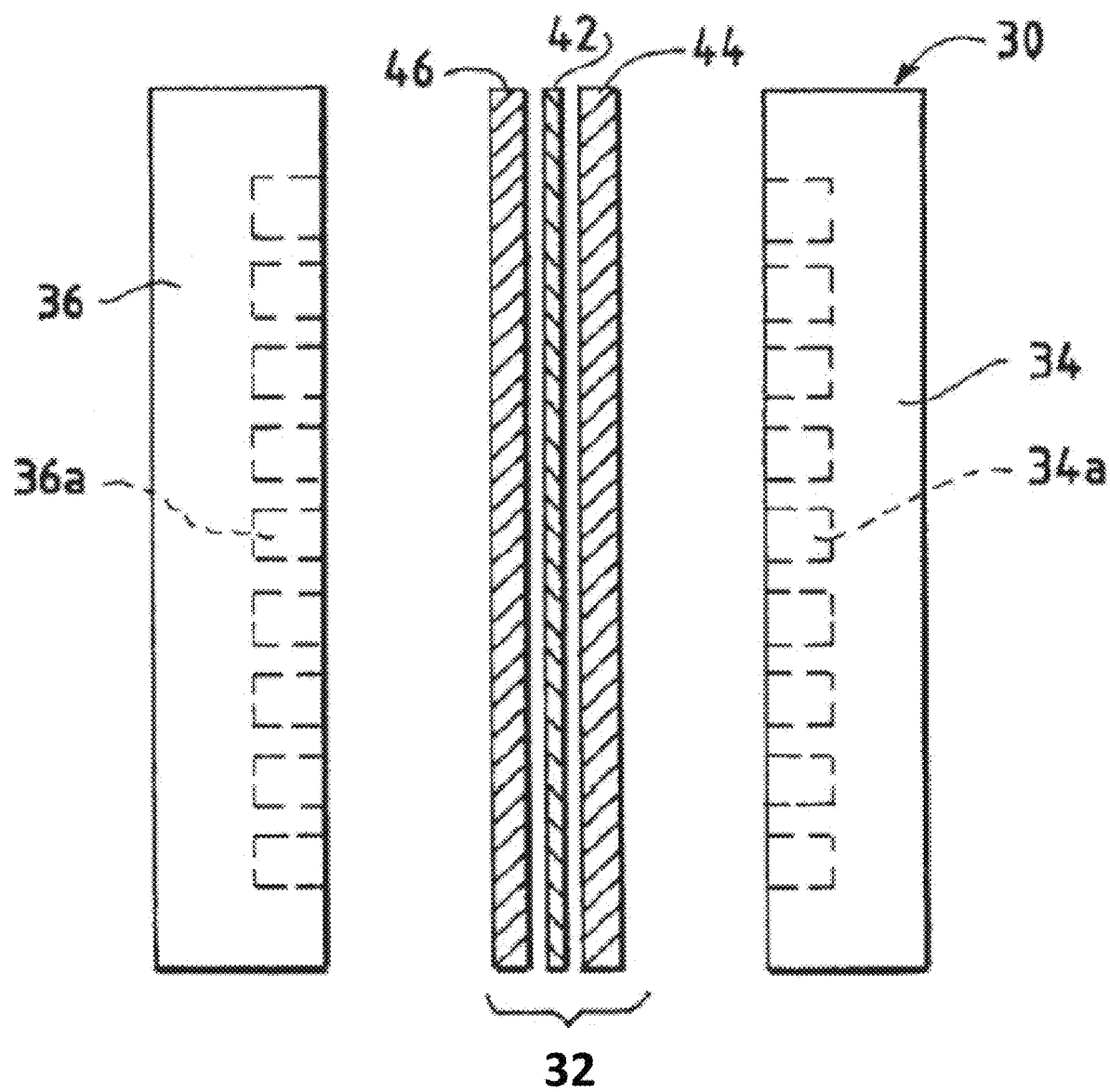
FIG. 2 is an exploded side view of an electrolyzer cell assembly including a membrane electrode assembly interposed between two fluid flow field plates having reactant flow channels formed in the major surfaces of the plates facing the electrodes.

FIG. 2 illustrates an exploded version of one of the cells in the stack illustrated in FIG. 1. Cell 30 includes a membrane electrode assembly 32 interposed between rigid flow field plates 34 and 36. The membrane electrode assembly 32 comprises an anion exchange membrane 42 interposed between two gas diffusion layers (GDLs), namely, anode GDL 44 and cathode GDL 46. Anode GDL 44 and cathode GDL 46 are typically formed of porous electrically conductive sheet material such as carbon fiber paper or nickel fiber paper, and have planar major surfaces. Electrodes 44 and 46 have a thin layer of catalyst material disposed on their major surfaces at the interface with membrane 42 to render them electrochemically active. Anode flow field plate 34 has at least one open faced channel 34a formed in its major surface facing membrane electrode assembly 32. Similarly, cathode flow field plate 36 has at least one open faced channel 36a formed in its major surface facing membrane electrode assembly 32. When assembled against the cooperating surfaces of electrodes 44 and 46, channels 34a and 36a form the reactant flow field passages for the anode reactant (fuel) stream and cathode reactant (oxidant) stream, respectively.

The cells can also contain a metal mesh, a perforated metal sheet, or metal foam between the GDL and the flow plates. Optimal openings are between 1 and 20 mm. The flow plates can have a flow channel machined into their body or flat plates can be used, and the metal mesh or metal plate serves as a flow channel.

Alternatively, the catalyst material can be deposited directly on the membrane.

In the case of an AEM water electrolyzer, anion exchange membrane 42 (see FIG. 2) comprises a hydrocarbon backbone such as a copolymer of styrene and chloromethyl styrene, and a positively charged amine. Positively charged cyclic amines, such as imidazoliums, pyridiniums and piperidiniums are typically employed.

U.S. Pat. No. 9,340,882 teaches that the catalyst layer on the cathode should not contain any ionomer, but superior performance has been found in the present electrolyzer when an ionomer is used. Superior performance has also been found when membrane 42 and electrodes 44 and 46 are bound together to form a unified electrode assembly (UEA).

During operation, a mixture comprising water and a base is fed into the anode and/or cathode inlet manifolds. The solution flows through the cell and out through the outlet manifolds. The solution typically has a pH above 8 and may contain sea water, salt and other components.

If high currents of 1 A/cm² or more are desired, the solution should have a pH of at least 12.

Experimentally, it has been found that suitable performance occurs when the conductivity of the solution is above 0.05 S/cm, with the best performance occurring when the solution conductivity is between 0.1 and 0.4 S/cm Once the solution is flowing, a voltage is applied between the anode of one of the cells (for example, anode 101a) and the cathode of a different cell (for example, cathode 103c) to promote a desired electrochemical reaction. In an AEM water electrolyzer, the following reaction occurs at the cathode:

$$2H_2O + 2e^- \rightarrow H_2 + 2OH^- \quad (1)$$

The hydroxyls then travel through the membrane where they react at the anode to produce oxygen:

$$2OH^- \rightarrow \tfrac{1}{2}O_2 + H_2O + 2e^- \quad (2)$$

The net reaction becomes:

$$H_2O \rightarrow \tfrac{1}{2}O_2 + H_2 \quad (3)$$

It would be particularly desirable for all of the current supplied to the cell to go toward producing hydrogen and oxygen, but in practice a portion of the current, called the "shunt current", bypasses the MEA. For example, if the solution flowing into the inlet manifold 110 in FIG. 1 is a good electrical conductor, then current can flow from anode 101a, out the pipe 111, into the manifold 110, and back into pipe 112, and then to anode 102a, bypassing the MEA in cell 101. Current that bypasses the MEA is wasted since it does not produce any reaction product(s), so eliminating or mitigating the shunt current is desirable.

The previous patent literature describes several ways to avoid shunt current in electrolyzers. Generally, the approach has been to include a polytetrafluoroethylene (PTFE) or other hydrophobic material in the flow path between adjacent cells. Gas bubbles generated during the electrochemical process build up in the flow path, thereby blocking the shunt current. Such an approach works when sufficient gas builds up near the inlet and outlet of the cell but that approach does not work for commercial scale AEM water electrolyzers because there are few or no bubbles near the inlet to the cathode and anode of the cell and the solution flowrate is high, so bubbles do not accumulate. So a different approach to reduce the shunt current is needed.

The AEM electrolyzer design of FIG. 1 employs two different approaches to reduce the shunt current:
(a) The connecting tubes (pipes) 111, 112, 113, 121, 122, 123, 131, 132, 133, 141, 142 and 143 are all formed of non-conducting materials, thereby eliminating a path for shunt current via electron conduction through the metal.
(b) The ionic path back through the manifold is long, so that very few ions flow from anode 101a to anode 102a.

Figure 3:
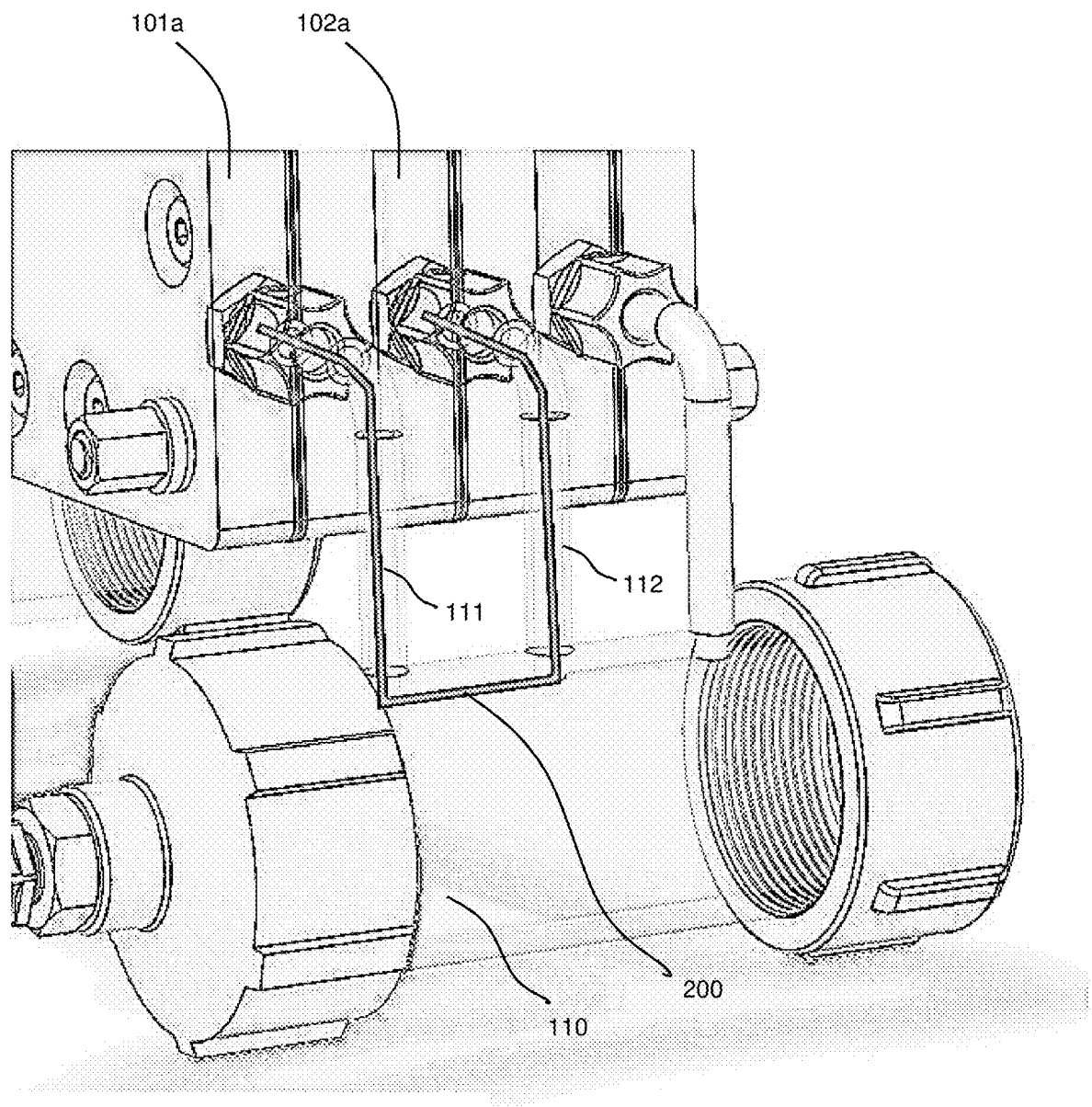
FIG. 3. is a perspective view, partially transparent, of a section of the electrolyzer stack of FIG. 1, with the minimum ion conduction path between the anode 101a and the anode 102b indicated as path 200.

FIG. 3 illustrates the shortest ion conduction path between the anodes of cells 101 and 102. In this case, the shortest conduction path 200 extends from the point on the anode next to the fitting, down through pipe 111, through the manifold 110 and back up through pipe 112.

It has been found that the shunt current can be lowered to below 5% of the cell current if, for each of the cells in the stack, the length of the shortest ion conduction path ($L_{ano}$) between anodes of different cells in the stack is:

where t is the membrane thickness, $\sigma_{sol}$ is the conductivity of the solution being fed into the anode in S/cm, and $\sigma_{mem}$ is the ion conductivity of the membrane measured in the solution at the operating temperature. Typically, $\sigma_{mem}$ is measured in 1 M KOH at 60° C.

$L_{ano}$ is calculated by the following method:
(a) Number the cells: 1, 2, 3, . . . ;
(b) Make a list of all of the pairs of cells;
(c) Calculate the minimum ion conduction path ($L_{ano(i,j)}$) between the anode of cell i and the anode of cell j, for all of the pairs of cells in the stack;
(d) $L_{ano}$ equals the minimum value of all of the $L_{ano(i,j)}$ values calculated.

For example, if a stack has 4 cells numbered 1, 2, 3, and 4, then there are six pairs of cells (1,2), (1,3), (1,4), (2,3), (2,4), (3,4). $L_{ano(1,2)}$, $L_{ano(1,3)}$, $L_{ano(1,4)}$, $L_{ano(2,3)}$, $L_{ano(2,4)}$, and $L_{ano(3,4)}$ would then be calculated or measured. $L_{ano}$=minimum($L_{ano(1,2)}$, $L_{ano(1,3)}$, $L_{ano(1,4)}$, $L_{ano(2,3)}$, $L_{ano(2,4)}$, $L_{ano(3,4)}$).

Similarly, the shunt current between adjacent anodes will typically be less than 1% of the cell current if:

Shunt current between cathodes must also be considered. The shunt current between adjacent cathodes will be less than 5% of the cell current if:

where $L_{cat}$ is the length of the shortest ion conduction path between the cathodes of two different cells in the stack calculated by the following method:
(a) Number the cells: 1, 2, 3, . . . ;
(b) Make a list of all of the pairs of cells;
(c) Calculate the minimum ion conduction path ($L_{cat(i,j)}$) between the cathode of cell i and the cathode of cell j for all of the pairs of cells in the stack;
(d) $L_{cat}$ equals the minimum value of all of the $L_{cat(i,j)}$ values calculated.

Similarly, the shunt current between adjacent cathodes will be less than 1% of the cell current if:

$$L_{cat} > 50 * t * \sigma_{sol} / \sigma_{mem} \quad (7)$$

Figure 4:
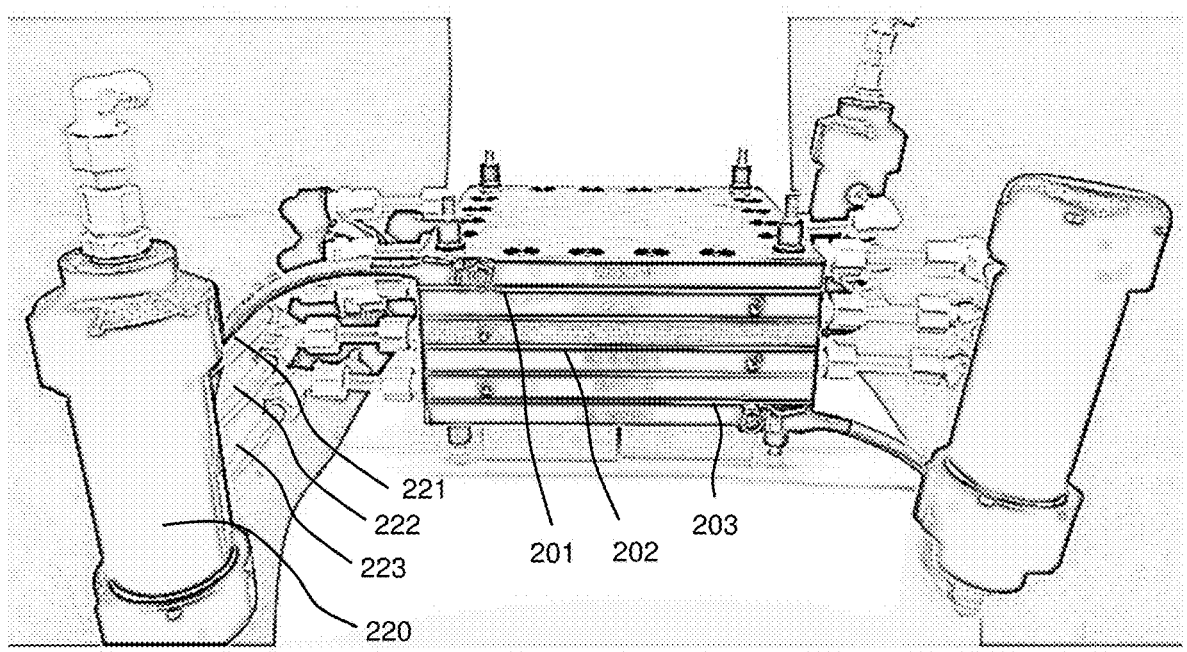
FIG. 4. is a perspective view of the water electrolyzer built according to the description in Specific Example 1.

FIG. 4 is an illustration of the actual AEM water electrolyzer. Note that the electrolyzer has long tubes 221, 222 and 223 to connect cells 201, 202 and 203 to cathode header 220. The long tubes minimize, or at least mitigate, the shunt current.

Specific Example 2

Anode inlet manifold 110 in FIG. 1 is external to the stack. Specific Example 2 describes an alternate design for an AEM water electrolyzer in which the inlet manifold is internal to the stack and insulated from the metal plates.

Figure 5:
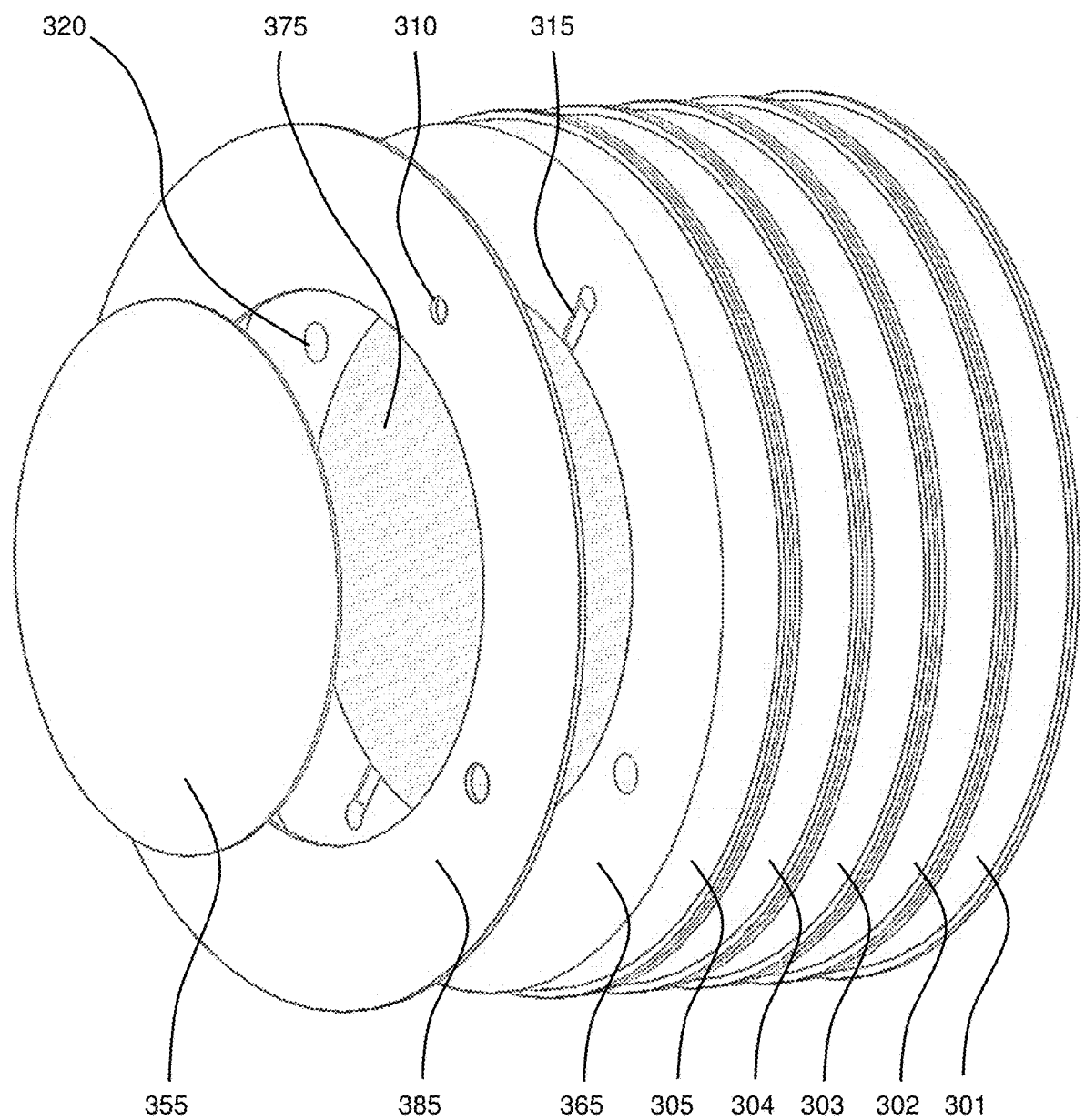
FIG. 5. is an exploded perspective view of a 5-cell electrolyzer stack with internal fluid connections. The top cell of the stack has been further expanded to reveal the internal components.

FIG. 5 illustrates such a design with an internal inlet manifold. The stack shown includes cells 301, 302, 303, 304 and 305. Cell 305 includes:
  (a) a bipolar plate 355 that serves as the anode of a given cell and the cathode of an adjacent cell;
  (b) a plastic frame 365;
  (c) an opening 310 through the plastic frame that serves as an anode header;
  (d) a notch 315 that serves as a connection between anode header 310 and anode GDL 375;
  (e) an insulating gasket 385 that isolates bipolar plate 355 from anode header 310 and the notch 315; and
  (f) a second hole 320 that serves as a cathode header.

In such a case, the shortest ion conduction path may not be between adjacent anodes/bipolar plates. Instead, the shortest ion conduction path may be between the anode GDL in one cell, and the anode GDL in a second cell. In that case, the equations 4, 5, 6 and 7 need to be replaced by $$L_{GDLA} > 10 * t * \sigma_{sol}/\sigma_{mem} \tag{8}$$

$$L_{GDLA} > 50 * t * \sigma_{sol}/\sigma_{mem} \tag{9}$$

$$L_{GDLC} > 10 * t * \sigma_{sol}/\sigma_{mem} \tag{10}$$

$$L_{GDLC} > 50 * t * \sigma_{sol}/\sigma_{mem} \tag{11}$$

where $L_{GDLA}$ is the length of the shortest ion conduction path between the anode GDL of one cell in the stack and the anode GDL in another cell in the stack. $L_{GDLC}$ is the length of the shortest ion conduction path between the cathode GDL of one cell in the stack and the cathode GDL in another cell in the stack.

$L_{GDLA}$ is calculated by the following method:
  (a) Number the cells: 1, 2, 3, . . . ;
  (b) Make a list of all of the pairs of cells;
  (c) Calculate the minimum ion conduction path ($L_{GDLA(i,j)}$) between the anode GDL of cell i and the anode GDL of cell j for all of the pairs of cells in the stack;
  (d) $L_{GDLA}$ equals the minimum value of all of the $L_{GDLA(i,j)}$ values calculated.

$L_{GDLC}$ is calculated by the following method:
  (a) Number the cells: 1, 2, 3, . . . ;
  (b) Make a list of all of the pairs of cells;
  (c) Calculate the minimum ion conduction path ($L_{GDLC(i,j)}$) between the cathode GDL of cell i and the cathode GDL of cell j for all of the pairs of cells in the stack;
  (d) $L_{GDLC}$ equals the minimum value of all of the $L_{GDLDC(i,j)}$ values calculated.

If equations 9 and 11 are satisfied, the shunt current will be less than 1% of the total cell current.

While particular elements, embodiments and applications of the present invention have been shown and described, it will be understood that the invention is not limited thereto since modifications can be made by those skilled in the art without departing from the scope of the present disclosure, particularly in light of the foregoing teachings.

The examples given above are merely illustrative and are not meant to be an exhaustive list of all possible embodiments, applications or modifications of the present electrochemical device. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the chemical arts or in the relevant fields are intended to be within the scope of the appended claims.

What is claimed is:

1. A water electrolyzer for producing hydrogen gas comprising an electrolyzer stack, the stack comprising at least two electrochemical cells, each of said cells comprising:
  (a) an anode comprising an anode gas diffusion layer (GDL) and a quantity of anode electrocatalyst;
  (b) a cathode comprising a cathode GDL and a quantity of cathode electrocatalyst;
  (c) a source of a solution comprising water directed to at least one of said anode and said cathode;
  (d) an anion exchange membrane interposed between said anode and said cathode,
  wherein each of said anion exchange membranes has an average thickness (t) and,
  wherein a shortest ion conduction path ($L_{GDLA}$) between the anode GDL of any two of the cells in the stack is:
  $L_{GDLA} > 10 * t * \sigma_{sol}/\sigma_{mem}$
  where $\sigma_{sol}$ is the conductivity (S/cm) of the solution at 60° C. and $\sigma_{mem}$ is the conductivity of each of said membranes measured in 1 M KOH at 60° C.,
  wherein $L_{GDLA} > 3$ cm.

2. The water electrolyzer of claim 1, wherein:

$$L_{GDLA} > 50 * t * \sigma_{sol}/\sigma_{mem}.$$

3. The water electrolyzer of claim 1, wherein the shortest ion conduction path ($L_{GDLC}$) between the cathode GDL of any two of the cells in the stack is:

$$L_{GDLC} > 10 * t * \sigma_{sol}/\sigma_{mem}.$$

4. The water electrolyzer of claim 1, wherein said solution has a pH greater than 8 at 25° C.

5. The water electrolyzer of claim 4, wherein said solution has a pH greater than 12 at 25° C.

6. The water electrolyzer of claim 1, wherein said solution has a conductivity greater than 0.05 S/cm at 25° C.

7. The water electrolyzer of claim 1, wherein said cathode electrocatalyst in each of said cells is in the form of unsupported particles or particles supported on an electrically conductive support, said particles having an average size between 0.6 nm and 100 nm.

8. The water electrolyzer of claim 1, wherein said anode electrocatalyst in each of said cells comprises a base metal catalyst.

9. The water electrolyzer of claim 8, wherein said anode electrocatalyst in each of said cells consists essentially of one or more base metal catalysts.

10. The water electrolyzer of claim 1, wherein said cathode electrocatalyst in each of said cells comprises a base metal catalyst.

11. The water electrolyzer of claim 10, wherein said cathode electrocatalyst in each of said cells consists essentially of one or more base metal catalysts.

12. The water electrolyzer of claim 1, wherein said membrane in each of said cells comprises positively charged cyclic amines.

13. The water electrolyzer of claim 12, wherein said positively charged amines are imidazoliums, piperidiniums or pyridiniums.

14. The water electrolyzer of claim 1, wherein said cathode in each of said cells comprises an ionomer.

15. An AEM water electrolyzer for converting water into substantially $O_2$ and $H_2$ comprising:
- an electrolyzer stack, said electrolyzer stack comprising at least two electrochemical cells, each of said cells comprising:
  - (a) an anode comprising an anode gas diffusion layer (GDL) and a quantity of anode electrocatalyst;
  - (b) a cathode comprising a cathode GDL and a quantity of cathode electrocatalyst;
  - (c) a source of a solution comprising water directed to at least one of said anode and said cathode;
  - (d) an anion exchange membrane interposed between said anode and said cathode,
  - wherein a shortest ion conduction path ($L_{GDLA}$) between the anode GDL of any of the two cells of said at least two electrochemical cells in the stack is greater than 3 cm.

* * * * *